Patented Apr. 23, 1940

2,198,206

UNITED STATES PATENT OFFICE 2,198,206

TREATMENT OF COFFEE

Sidney Musher, New York, N. Y., assignor to Musher Foundation Incorporated, New York, N. Y., a corporation of New York No Drawing. Application October 28, 1939, Serial No. 301,757

4 Claims. (Cl. 99—152)

This application relates to retarding the development of staleness and to improving the quality of roasted coffee and is a continuation in part of application, Serial No. 102,631 filed September 25, 1936.

It has been found that although green coffee will keep almost indefinitely without oxidative deterioration, when the coffee beans are subjected to the roasting treatment at the elevated temperature of between about 400° F. and 500° F., those same coffee beans become very much subject to oxidative deterioration, staleness, and to the loss of their freshly roasted flavors and aromas.

In my prior application, Serial No. 261,667, filed March 13, 1939, I have disclosed methods for producing cereal extracts, containing water soluble carbohydrates and organic nitrogen and phosphorus compounds, which may be added to food compositions or other similar organic materials subject to oxidative deterioration to help protect them against such oxidation.

According to this application, Serial No. 261,667, water soluble extracts are prepared desirably from the finely divided, unbleached, dry milled cereals and cereal products. For example, cereal germs such as wheat germ, corn germ, rice germ and oat germ which may contain some of the bran and which may be desirably de-oiled to less than 10% glyceride oil, and/or the meal portions of cereals such as oats, yellow or white maize or hominy, barley and less preferably wheat, rye, rice, and buckwheat, with or without dehulling or decorticating, may be mixed with water or alcohol or mixtures of water and alcohols at a temperature of about between 125° F. and 145° F. and at a pH between about 5.0 and 7.0 and desirably at a pH of 6.0 for 1 to 5 hours to remove the water or alcohol soluble materials from the cereals without substantial gelatinization, dextrinizing, solubilizing or conversion of the starch and proteins present in the cereals.

The water soluble cereal antioxygenic mixture, which is substantially free of oil, starch and fibre, is obtained in clarified dilute aqueous solution after filtration, centrifuging or settling out of the water insoluble cereal residues, and may be concentrated desirably in a stainless steel vacuum pan to over about 50% total solids and desirably to about 70% total solids.

It has now been found that when such an extract is utilized in concentrated or dilute solution for the treatment of whole coffee beans, such coffee beans should be at an elevated temperature in excess of 250° F. and desirably between 400° F. and 450° F. and following the roasting operation in order for the extract to become sufficiently effective in stabilizing the coffee against oxidative deterioration and the extract should be added in combination with such an amount of water as to drop the temperature to about 200° F. or below and stop further roasting.

For example, the coffee beans may be first roasted by being subjected to direct flame treatment and, as soon as the roasting operation has been completed and the beans are of the desired roasted color, aroma and flavor, the extract in aqueous form is applied to the hot roasted coffee beans by being sprayed on those beans in the roasting chamber and while the beans are at the highest temperature of roasting.

There is applied to the beans desirably between 0.05% and 3% of the extract on its solids weight basis against the weight of the coffee and preferably between 0.5% and 1% of the extract is used.

Where, for example, 40 pounds of water are applied to 500 pounds of coffee beans, there may be added to the 40 pounds of water before being sprayed on the beans in the roasting chamber 3½ pounds of the 70% total solids slightly acidified concentrated water extract of finely divided dry milled wheat germ, the extract having first been added to the 40 pounds of water and 43½ pounds of the combination of the water and wheat germ extract being applied to the 500 pounds of roasted coffee beans in the cylinder immediately as the flame is extinguished and while the beans are at the elevated temperature of roasting, substantially above 250° F.

At the time of application of the water containing the extract to the roasted beans and while they are at the elevated temperature, it is estimated that about 60% to 70% or possibly more of the water which is applied to the roasted beans in this manner is immediately converted to steam and only a small proportion remains in the coffee beans.

Where the unconcentrated water extract is applied, the amount of total solids in the unconcentrated water extract may be determined and there may be utilized the unconcentrated water extract to the same extent, that is, to the extent of approximately 0.05% to 3% of the solids of the extract against the total weight of the coffee.

The coffee beans obtained in this manner show a slightly increased gloss at the surface but otherwise are not materially different in appearance. The coffee may then be ground or otherwise processed as in the manufacture of the various grades of ground roasted coffee and the ground coffee shows no differences in appearance after this treatment.

When coffee is treated in this manner, the development of staleness in the coffee is markedly retarded and the fresh flavor and aroma characteristics of the coffee are retained to a definite degree.

Coffee after roasting normally develops staleness within about 10 to 20 days, particularly after storage at room temperature in ground form.

In accordance with this invention, however, and where the concentrated water extracts of the cereals are applied in aqueous form to the coffee beans while they are at an elevated temperature, it has been observed that the development of staleness in the coffee is extended for frequently to 2 to 3 times as long as where the extract is not applied to the coffee.

Apparently these extracts are most efficacious in stabilizing the roasted coffee when applied in water to the heated beans or as a means of rapidly lowering the temperature of the coffee since if the extract be added to the cold roasted coffee after the coffee has been allowed to cool, much less stabilizing effect is observed. Most desirably, the extract is added therefore while the temperature of the roasted coffee is about 300° F. to 400° F. and unless the extract is added to the coffee beans while they are at the elevated temperature sufficient to produce the enhanced antioxygenic activity, the full results of the present invention are not obtained.

As another example, in the treatment of 500 pounds of coffee beans with approximately 40 pounds of water and 2½ pounds of the concentrated ethyl alcoholic extract of pulverized whole oats, the extract may first be applied to the roasted coffee just as soon as the roasting operation has been completed and while the coffee beans are still at the temperature of between 300° F. and 400° F. and immediately thereafter the 40 pounds of water may be applied, or, where desired, 15 pounds of the 40 pounds of water may be applied to the coffee in order to avoid any sudden combustion of the coffee or any burning from taking place but without reducing the temperature of the coffee to less than about 250° F. and the 2½ pounds of the ethyl alcoholic extract may then be applied followed by the application of the balance of the 25 pounds of water.

Less desirably, the germinated or sprouted cereals may be employed for extraction, such as where, for example, sprouted barley is employed for water extraction and for utilization in accordance with this invention.

Less desirably, there may be utilized the slightly acidified water or alcohol soluble extracts of the de-oiled, dry milled seeds and nuts such as of de-oiled soya flour, peanut flour, cottonseed flour, sesame seed flour, etc.

These extracts of the de-oiled seed and nut flours also contain water soluble carbohydrates and water soluble organic nitrogen and phosphorus compounds and are effective as stabilizers when applied to coffee at the high temperature of roasting and particularly when the extracts are obtained under the temperature and pH conditions referred to above.

It is possible to obtain dispersion of the extracts in the water with or without emulsifiers such as gums, gelatin, agar-agar, pectin and so forth for application to the heated coffee beans.

Having described my invention, what I claim is:

1. A method of improving the quality of roasted coffee which comprises applying to the roasted coffee immediately following roasting and while the coffee beans are at a temperature in excess of 250° F. a small amount of a water soluble extract of a cereal in aqueous dispersion.

2. The method of improving the quality of roasted coffee which comprises applying to the roasted coffee immediately following roasting and while the coffee beans are at a temperature in excess of 250° F. a small amount of an extract of a material selected from the group consisting of the dry milled unbleached cereals, cereal germs, and the de-oiled seeds and nuts, said extract being selected from the group consisting of the slightly acidified water and alcohol soluble extracts and said extract being applied to the coffee in aqueous dispersion.

3. A method of improving the quality of roasted coffee which comprises applying to the roasted coffee immediately following the roasting and while the coffee beans are at a temperature in excess of 250° F. a small amount of a water soluble extract of a cereal germ in aqueous dispersion.

4. A method of improving the quality of roasted coffee which comprises applying to the roasted coffee immediately following roasting and while the coffee beans are at a temperature in excess of 250° F. a small amount of a water soluble extract of maize in aqueous dispersion.

SIDNEY MUSHER.